United States Patent [19]
Kuga

[11] Patent Number: 5,828,367
[45] Date of Patent: Oct. 27, 1998

[54] DISPLAY ARRANGEMENT

[75] Inventor: Kaeko Kuga, Kyoto, Japan

[73] Assignee: Rohm Co., Ltd., Kyoto, Japan

[21] Appl. No.: 273,328

[22] Filed: Jul. 11, 1994

[30]     Foreign Application Priority Data

Oct. 21, 1993  [JP]  Japan ................................. 5-263780
Oct. 21, 1993  [JP]  Japan ................................. 5-263800

[51] Int. Cl.$^6$ ................................................. G09G 5/00
[52] U.S. Cl. ............................ 345/211; 345/98; 345/87
[58] Field of Search ................................. 345/211, 212,
                    345/42, 52, 50, 213, 87, 98; 364/707

[56]                 References Cited

U.S. PATENT DOCUMENTS

| 4,820,023 | 4/1989 | Ohsawa ..................................... 345/52 |
| 5,034,734 | 7/1991 | Iguchi ...................................... 345/52 |
| 5,335,168 | 8/1994 | Walker ..................................... 364/707 |
| 5,374,941 | 12/1994 | Yuki et al. ............................... 345/98 |

FOREIGN PATENT DOCUMENTS

| 211308A2 | 2/1987 | European Pat. Off. . |
| 288168A3 | 10/1988 | European Pat. Off. . |
| 291252A2 | 11/1988 | European Pat. Off. . |
| 494610A2 | 7/1992 | European Pat. Off. . |
| 89-67029 | 2/1990 | Japan . |
| 89-69814 | 5/1990 | Japan . |
| 91187322 | 12/1993 | Japan . |

OTHER PUBLICATIONS

Bobrow, Fundamentals of Electrical Engineering, 1985, p. 749.

*Primary Examiner*—Xiao Wu
*Attorney, Agent, or Firm*—Baker & Botts, L.L.P.

[57]                 ABSTRACT

A display arrangement includes a memory for storing image signals of one field supplied to an LCD display section, a comparator for determining whether the image signals of the next field to be supplied to the LCD display are those for a fixed image display or a changing image display by comparing those image signals with the image signals of the preceding field stored in the memory, and a controller for controlling a display driver so that, when the comparator determines that the image signals are for a fixed image display, the driver drives the LCD panel in a reduced-power drive mode. In one embodiment, the reduced-power drive mode is a spread-out mode and, in another embodiment, the reduced-power drive mode is a low-voltage mode.

10 Claims, 5 Drawing Sheets

DISPLAY ARRANGEMENT

BACKGROUND OF THE INVENTION

The present invention relates to display arrangements which are adaptable for various portable devices, such as data-processing, communication, video and game devices, and for devices such as wireless communication devices carried on ships and in motor cars.

In conventional display devices used for laptop personal computers, for example, a liquid crystal display (LCD) panel of the thin-film transistor (TFT) active-matrix type in which pixels are arrayed in a matrix fashion, is used for a display section. The LCD panel is driven by a driving arrangement such as a source-gate driver while supplied with voltage from a battery so as to display an image.

In conventional LCD panels, as shown in FIG. 6, an array containing signal electrodes 1, scan electrodes 2, TFTs 3 and pixel electrodes 4 is provided on one side of an insulating substrate (not shown) in the form of a matrix. A corresponding array of common electrodes 5 is formed on the other side of the insulating substrate, and a liquid crystal layer is interposed between the common electrodes 5 and the pixel electrodes 4. The pixel electrodes are selectively driven to display an image when appropriate voltages are applied by line-sequential scanning of the signal electrodes 1 and the scan electrodes 2.

When a scan voltage is applied to the scan electrodes 2 of the first line of pixels by a gate driver 6, the TFTs 3 of the first line connected to the scan electrode 2 are rendered conductive. In this state, the signal electrodes 1 are connected to the pixel electrodes 4 of the first line, and a signal voltage (i.e., an image signal) is applied to the pixel electrodes 4 of the first line from a source driver 7. By repeating this voltage application at horizontal scan intervals, the scan drive operates sequentially from the first line to all subsequent lines, and the display panel displays an image of one field. By repeating the voltage-applying operation to every field at vertical scan intervals, a complete image is reproduced. The polarity of the signal voltage applied to the pixel electrodes 4 is inverted every line or every field so as not to cause a DC component to accumulate on the LCD panel.

In this type of the display device, the necessity for a high duty cycle requires an increase in the LCD drive voltage. Accordingly, the voltage from the power source applied to the LCD panel is also set relatively high. As a result, the power consumed during the image displaying operation is increased. This increase in power consumption presents difficulties for devices of the type which must be operated by using a power source having a limited power capacity such as a battery.

SUMMARY OF THE INVENTION

Accordingly, it is an object of the present invention to provide a display arrangement which overcomes the disadvantages of the prior art.

Another object of the invention is to provide a display arrangement which can operate with reduced power consumption without substantial deterioration in the quality of the image displayed.

These and other objects of the invention are attained by providing a display arrangement including a display section for visually presenting image signals, a power source for applying voltage to the display section, a driver for driving the display section, a memory for storing image signals to be supplied to the display section, a comparison unit for determining whether the image signals to be supplied to the display section are those for a constant image display or for a changing image display by comparing the image signals to be supplied to the display section with the image signals read out of the memory, and a control unit for controlling the driver so that, when the comparison unit determines that the image signals to be supplied to the display section are those for a constant image display, the power requirements of the display arrangement are reduced.

In a specific arrangement, the memory stores the image signals of one field to be supplied to the display section and the comparison unit compares the image signals of a field to be supplied to the display section with the image signals of the preceding field read out of the memory. The display section is an LCD panel and the memory is a nonvolatile memory.

When a changing image is displayed, the driver drives all of the image portions so as to reproduce a clear and easy-to-see image. Lower visibility is required for the display of a constant image. Since it is motionless, the after-image effect can be fully utilized. For this reason, according to one embodiment of the invention, the application of drive signals to the display section may be spread out spatially or temporally down to the lower limit level of the drive required to maintain the image display or to such an extent as to be at a minimum display level. This drive mode will be referred to as a spread-out drive mode. The spread-out drive reduces the power consumed during the display operation.

According to another embodiment of the invention, when a changing image is displayed, the display section is driven at a voltage sufficient to reproduce a clear and easy-to-see image. Such high visibility is not required for the display of a constant image since it is motionless. Accordingly, in this embodiment, the voltage applied to the display section for displaying a constant image is the minimum voltage necessary to maintain the image display, which is lower than the voltage applied to the display section for displaying a changing image. This leads to reduction of the power consumed by the display device.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Typical embodiments of the present invention in the form of a display arrangement for a personal computer of which the display section is an LCD panel will be described with reference to the accompanying drawings. In these embodiments, a changing image is displayed in a normal mode, while a constant image is displayed in a power-saving mode. In the first embodiment, the drive of the LCD panel is spread out spatially or temporally down to the lower limit of the drive level required to maintain the image display utilizing the after-image effect. This drive control function may be added to any display arrangement so that the display arrangement of the invention is useful for any type of signal-processing and/or communication device.

Figure 1:
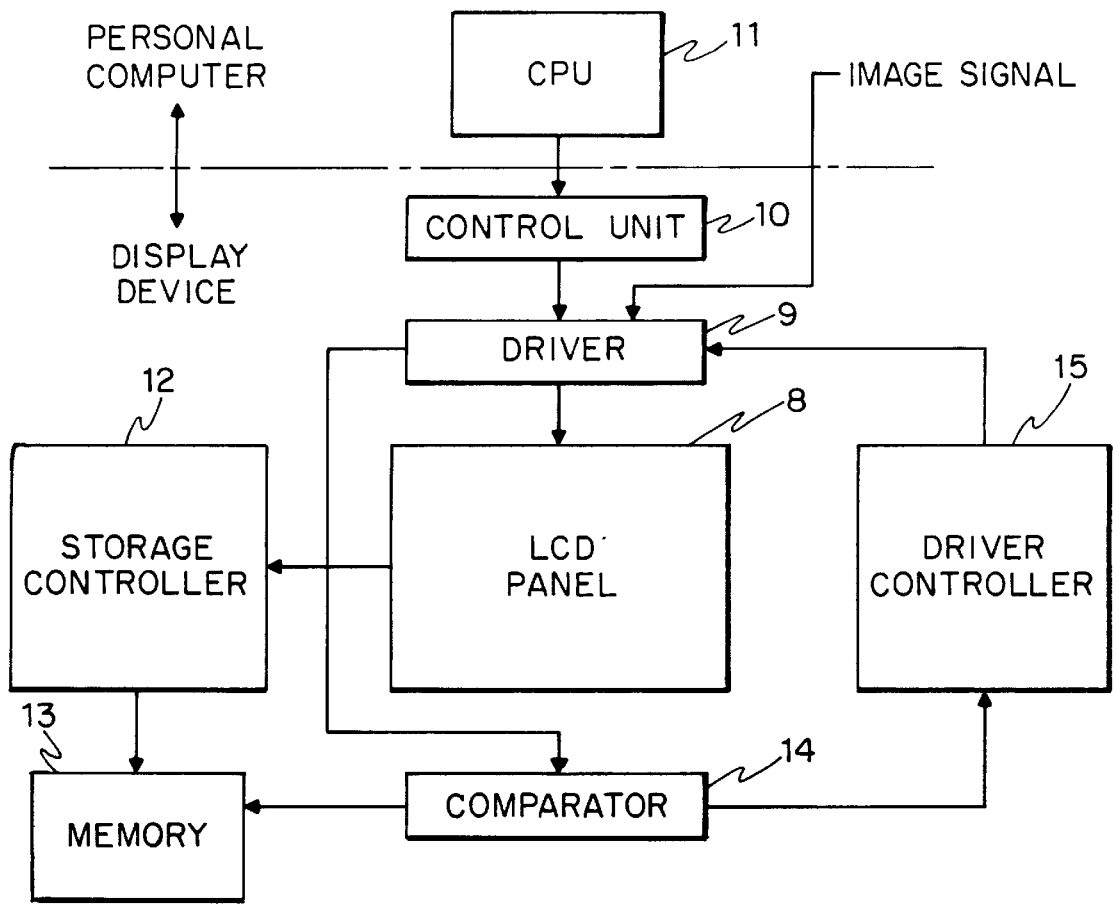
FIG. 1 is a schematic block diagram showing a first representative embodiment of a display arrangement according to the present invention.
Figure 3:
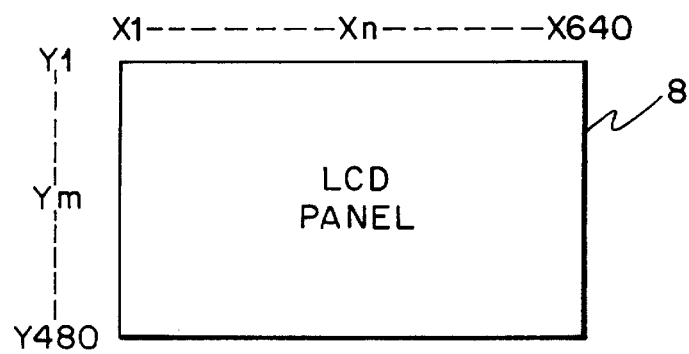
FIG. 3 is a schematic diagram showing a display panel illustrating the arrangement of numbered lines and pixels in the display.

As shown in FIG. 3, an LCD panel 8 of the TFT active-matrix type contains a number of pixels (480×640 pixels in this embodiment) arrayed in a matrix fashion. The output from a driver 9, shown in FIG. 1, sequentially drives the LCD panel 8 in response to timing signals received from a control unit 10, thereby displaying an image. The driver 9 includes a gate driver for sequentially selecting a scanning line or lines from among the first to the 480th line and a source driver for applying image signals to the pixels, i.e., 640 pixels, on the scanning lines selected by the gate driver.

A CPU 11, contained in a personal computer, controls the display of images by the LCD panel 8. The image display operation in the LCD panel 8 is controlled by controlling timing signals provided by the control unit 10 in accordance with key operation of the computer keyboard. A storage controller 12 receives image signals supplied from the personal computer to the LCD panel 8 and stores them in a memory 13. The memory 13 is a non-volatile memory of the type not requiring any special battery back-up, such as an EEPROM or a FRAM, and is capable of storing one field of image signals supplied to the LCD panel 8.

A comparator 14 receives both the image signals which are being supplied to the LCD panel 8 and the image signals of the preceding field, which are read out of the memory 13, and compares the image signals of the present and preceding fields to determine whether or not the image signals of the present field are those for a changing image display such as a screen scroll or those for a constant image display. When the image signals of the present field are approximately the same as those of the preceding field, the comparator 14 determines the image signals of the present field to be those for a constant image display.

Preferably, the comparator 14 determines the image signals to be those for a constant image display if more than 50% of the image signals of one field coincide with those of the previous field. In this case, when the image signals of the present field are different from those of the preceding field by at least 50%, the comparator 14 determines the image signals of the present field to be those for a changing image display.

A controller 15 controls the driver 9 which drives the LCD panel 8 in accordance with the result of the determination made by the comparator 14. When the comparator 14 determines that the image signals of the present field are those for a constant image display, the controller 15 controls the driver 9 so that it drives the LCD panel 8 in a spread-out drive mode. In the spread-out drive mode, the drive of the LCD panel 8 is spread out by applying fewer pixel signals or fewer line signals or fewer field signals per unit area or per unit time, for example, only every other signal, to such an extent that the display panel is kept at a bare minimum display level by the persistence or after-image effect. In this case, there is a danger that a DC component could be applied to the LCD panel 8 as the result of the spread-out drive mode. To avoid this, portions of the image to which the spread-out drive signals are applied are shifted every pixel, line or field in this embodiment.

When image signals for a changing image are applied to the display arrangement described above, the image signals for the present field are different from the image signals for the preceding field which are read out of the memory 13. That is, the image signals are changed every field. In this state, the comparator 14 determines that the image signals of the present field are those for the changing image display as a result of the comparison and the LCD panel 8 is driven in a normal mode by the controller 15 so as to obtain the normal display of a changing image. More specifically, all scanning lines are sequentially selected at the normal rate from the first line to the 480th line and image signals are applied at the normal rate to all 640 pixels on each of the lines in sequence. This sequence of the line-select and the image signal application is repeated every field. The result is to reproduce a clear image.

When image signals for a constant image are supplied to the display device, the image signals of the present field supplied from the driver 9 to the LCD panel 8 are the same as those of the preceding field read out of the memory 13. In this case, the comparator 14 determines that the image signals of the present field are for a constant image display and the controller 15 spreads out the drive of the LCD panel 8 as described above to such an extent as to be at a bare display level. Accordingly, the power consumption is correspondingly reduced.

Figure 2:
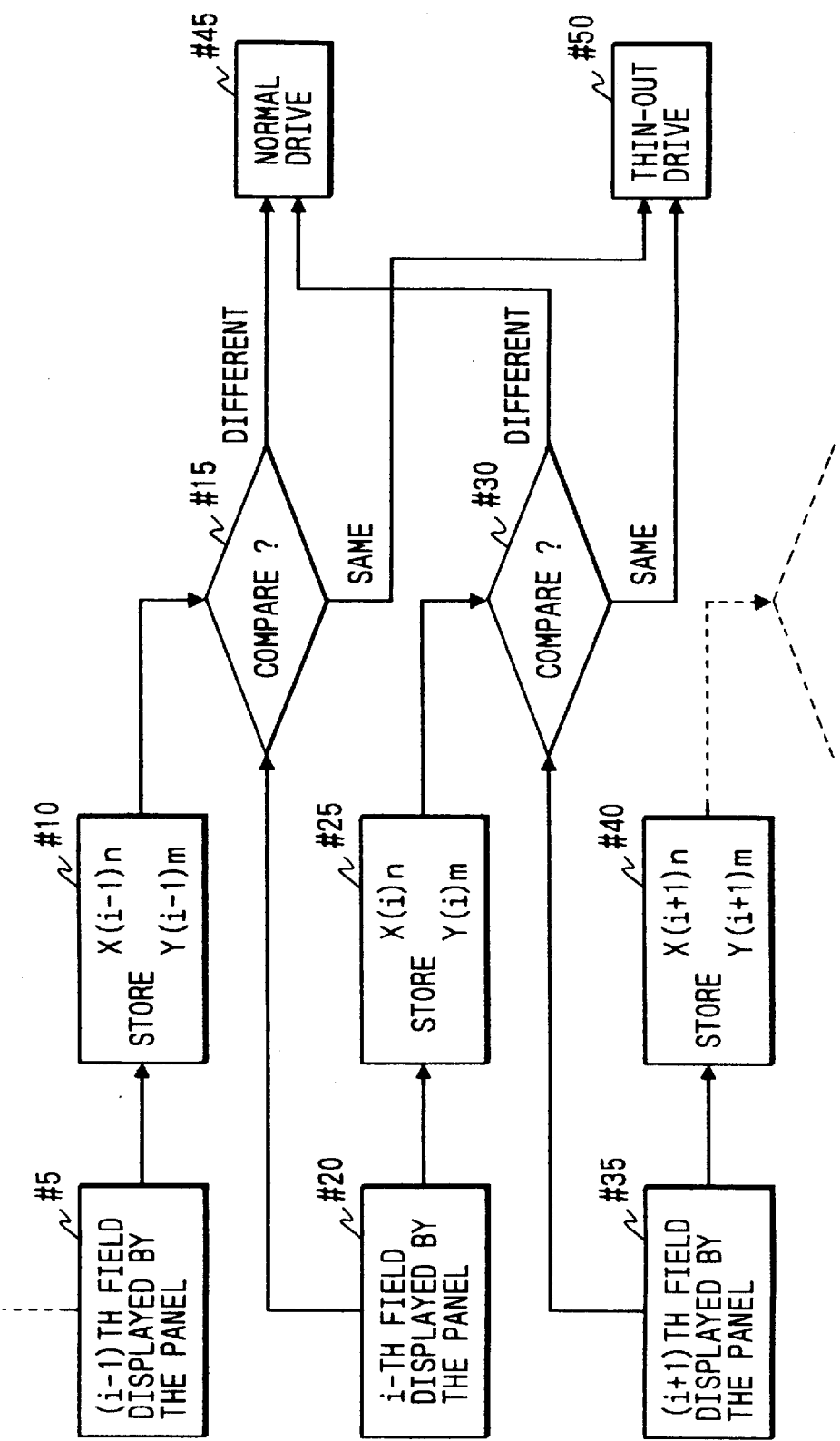
FIG. 2 is a schematic flow diagram illustrating the steps involved in control of the display arrangement according to the first embodiment of the invention.

FIG. 2 illustrates a representative drive control according to the invention in the form of a flow diagram showing a series of steps 5–50 which are carried out. It is assumed that, as shown in FIG. 3, Ym represents a given line number in the vertical (Y) direction on the LCD panel 8 consisting of 480×640 pixels and Xn represents a given pixel number on the line in the horizontal (X) direction, and further that, in Step 5 in FIG. 2, the image signals of the (i−1)th field are displayed on the LCD panel 8. In Step 10, the image signals of the (i−1)th field are stored in the memory 13. Before the image signals of the (i)th field are displayed on the LCD panel 8 in Step 20, the image signals of the (i)th field are compared in Step 15 with the image signals of the (i−1)th field which were stored in the memory 13 in Step 10.

If the image signals of the (i)th field are different from the image signals of the (i−1)th field, for example, the image signals X(i−1)n and Y(i−1)m of the (i−1)th field are at least 50% different from the image signals X(i)n and Y(i)m of the (i)th field, the image signals are determined to be those for a changing image display. As a result, Step 45 is carried out to drive the LCD panel 8 in a normal manner. The image signals of the (i)th field are displayed in Step 20. If the image signals of the (i)th field are the same as the image signals of the (i−1)th field, i.e., less than 50% different, the image signals are determined to be for the constant image display. Consequently, Step 50 is executed to drive the LCD panel 8 in a spread-out drive mode, and Step 20 is then executed to display the image signals of the (i)th field.

In Step 25, the image signals of the (i)th field are stored in the memory 13. Subsequently, a similar sequence of procedural operations is repeated. Before the image signals of the (i+1)th field are displayed on the LCD panel 8 in Step 35, the image signals of the (i+1)th field are compared with the image signals of the (i)th field which were stored in the memory 13 in Step 25. Either Step 45 or Step 50 is selected and executed in accordance with the result of that comparison. In Step 40, the image signals of the (i+1)th field are stored in the memory 13 as in the previous case.

While TFTs are used in the LCD panel in the above-mentioned embodiment, STSs may be used instead. In this case, the LCD panel is driven by a segment driver and a common driver. Also, the display section may be constructed with a display device other than an LCD panel, such as a cathode-ray tube, light-emitting diodes or a plasma display. In any case, the power consumption can be reduced by driving the display section in a spread-out drive mode during the display of a constant image.

In the display arrangement of the invention as described above, when a changing image is displayed, an LCD panel is driven so as to display an image normally. When a constant image is displayed, the LCD display panel is driven in a spread-out drive mode, thereby saving electric power. Thus, the display arrangement of the invention can display a quality image with reduced power consumption.

Figure 4:
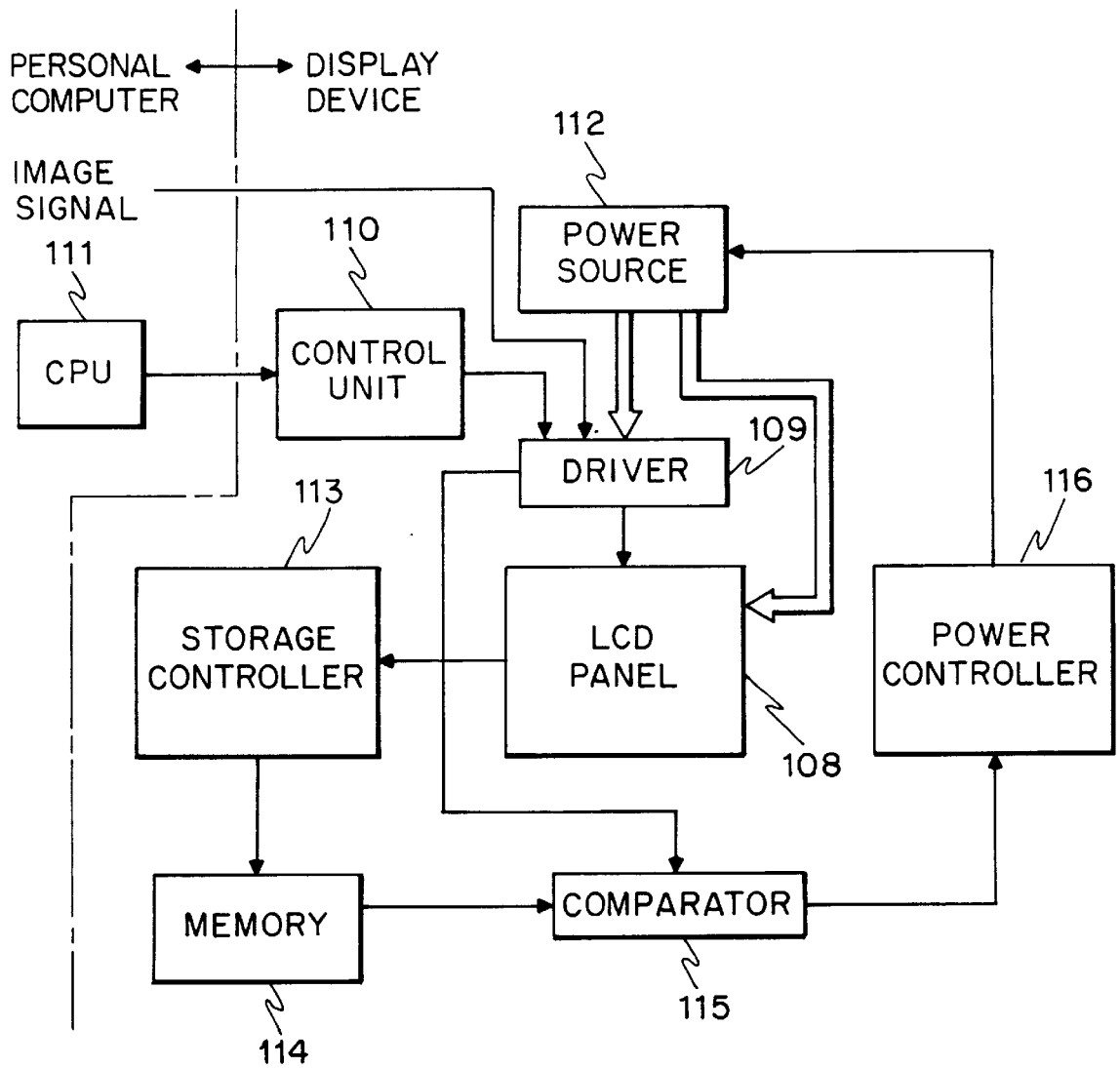
FIG. 4 is a schematic block diagram showing a second representative embodiment of a display arrangement according to the present invention.

In the power-saving mode of the second embodiment, shown in FIG. 4, the LCD panel is driven at the minimum voltage necessary to maintain the constant image display, which is lower than the voltage for displaying a changing image. This power control function may be added to any display device, so that the display arrangement of the invention is useful for any type of signal-processing and/or communications device.

As shown in FIG. 4, an LCD panel 108 of the TFT active-matrix type shown in FIG. 3 contains a number of pixels (480×640 pixels in this embodiment) arrayed in a matrix fashion. The output from a driver 109 sequentially drives the LCD panel 108 in response to timing signals received from a control unit 110, thereby displaying an image. The driver 109 includes a gate driver for sequentially selecting a scanning line or lines from among the first to the 480th line and a source driver for applying image signals to the pixels, i.e., 640 pixels, on the scanning lines selected by the gate driver.

A CPU 111, contained in a personal computer, controls the display of images by the LCD panel 108. The image display operation in the LCD panel 108 is controlled by controlling timing signals provided by the control unit 110 in accordance with key operation of the computer keyboard. A panel power source 112 supplies electric power to the LCD panel 108 and the driver 109 for image display purposes. A controller 113 receives the image signals supplied from the personal computer to the LCD panel 108 and stores them in a memory 114. The memory 114 is a nonvolatile memory of the type not requiring any special battery back-up, such as an EEPROM or a FRAM, and is capable of storing one field of image signals supplied to the LCD panel 108.

A comparator 115 receives both the image signals which are being supplied to the LCD panel 108 and the image signals of the preceding field, which are read out of the memory 114, and compares the image signals of the present and preceding fields to determine whether or not the image signals of the present field are those for a changing image display such as a screen scroll or those for a constant image display. When the image signals of the present field are approximately the same as those of the preceding field, for example, not more than 50% of the pixel signals have been changed, the comparator 115 determines the image signals of the present field to be those for a constant image display. When the image signals of the present field are different from those of the preceding field by at least 50%, for example, the comparator 115 determines the image signals of the present field to be those for a changing image display. A controller 116 controls the panel power source 112 in accordance with the result of the determination made by the comparator 115. The controller 116 controls the panel power source 112 so that, when the comparator 115 determines that the image signals of the present field are those of a fixed image display, the controller 116 reduces the power voltage applied from the panel power source 112 to the LCD panel 108 to the minimum voltage necessary for maintaining the image display.

When the image signals for a changing image are applied to the display arrangement described above, the image signals for the present field are different from the image signals for the preceding field which are read out of the memory 114. That is, the image signals are changed every field. In this state, the comparator 115 determines that the image signals of the present field are those for a changing image display as a result of its comparison, and the LCD panel 108 is driven at a high voltage by the controller 116 so as to obtain the normal display of a changing image so that a clear image is reproduced.

When image signals for a constant image are supplied to the display device, the image signals of the present field supplied from the driver 109 to the LCD panel 108 are approximately the same as those of the preceding field read out of the memory 114. In this case, the comparator 115 determines that the image signals of the present field are for a constant image display and the controller 116 reduces the voltage applied from the panel power source 112 to the LCD panel 108 to the minimum voltage necessary for maintaining the image display. Accordingly, the power consumption is correspondingly reduced.

Figure 5:
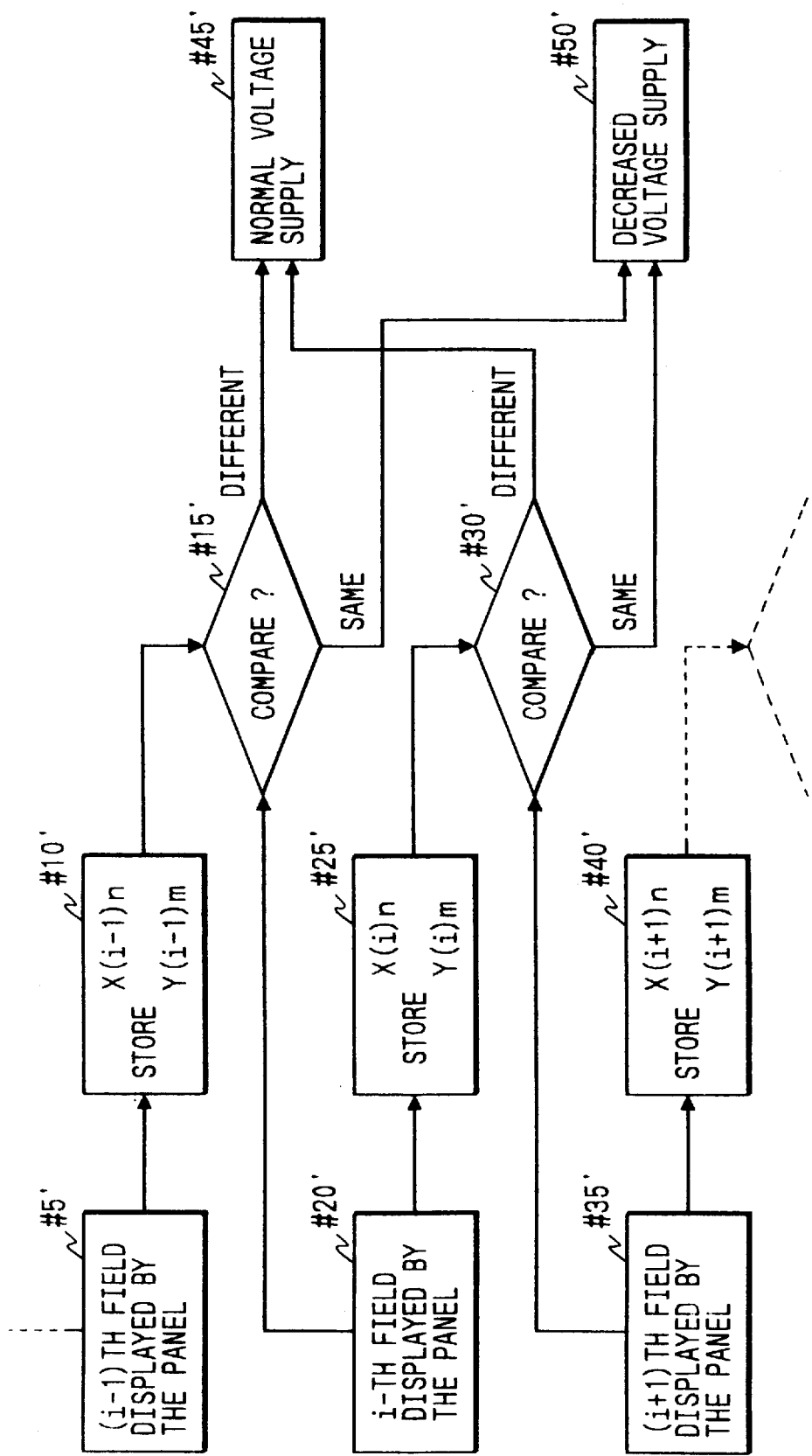
FIG. 5 is a schematic flow diagram illustrating the steps involved in controlling the power source according to the second embodiment of the invention.
Figure 6:
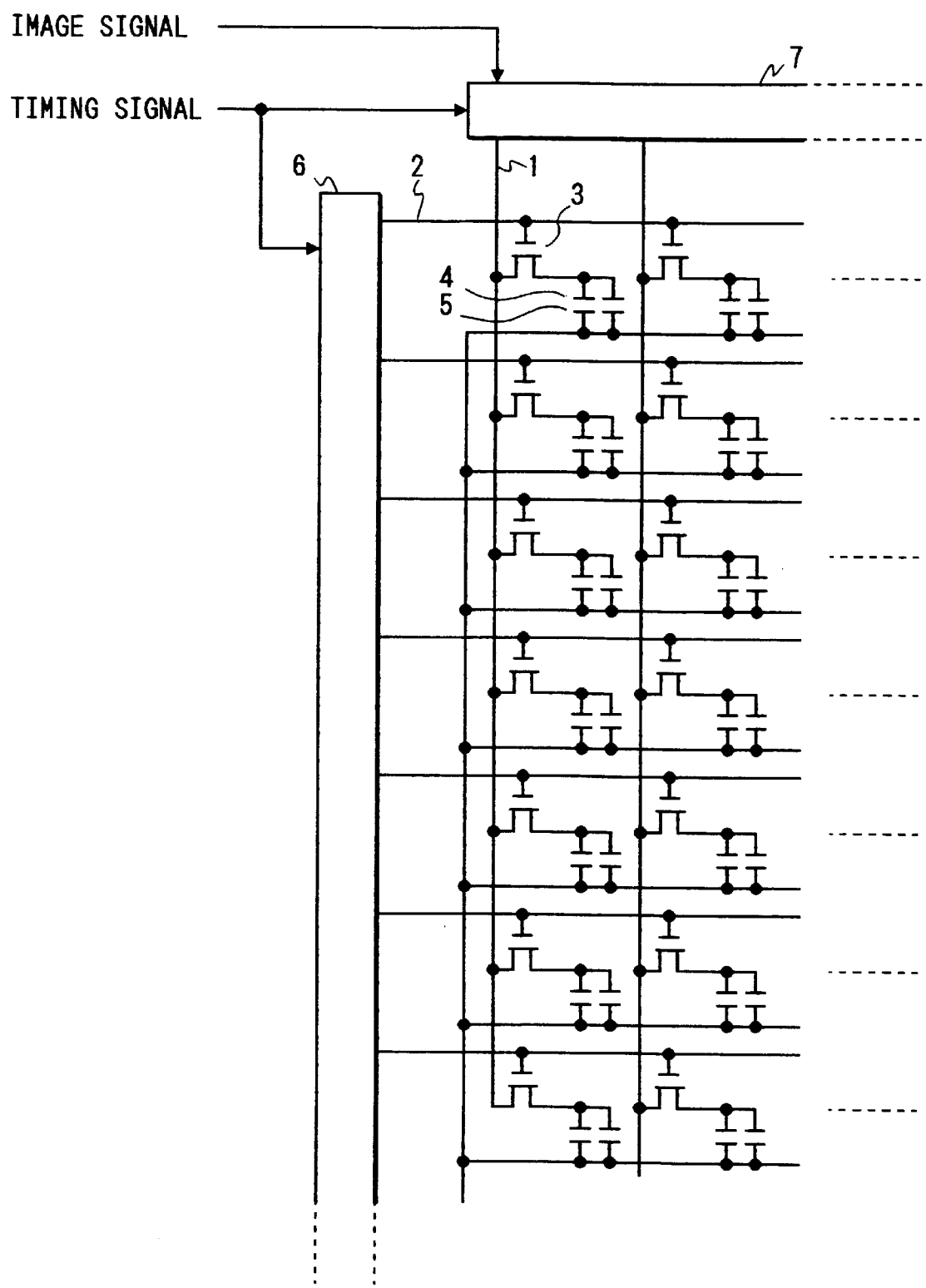
FIG. 6 is a schematic circuit diagram showing a conventional drive circuit for driving an LCD display panel.

FIG. 5 illustrates a representative power source control according to the second embodiment of the invention in a flow diagram showing a series of steps 5'–50' which are carried out. It is assumed that, as shown in FIG. 3, Ym represents a given line number in the vertical (Y) direction on the LCD panel 8 consisting of 480×640 pixels and Xn represents a given pixel number on the line in the horizontal (X) direction, and further that, in Step 5' in FIG. 5, the image signals of the (i−1)th field are displayed on the LCD panel 108. In Step 10', the image signals of the (i−1)th field are stored in the memory 114. Before the image signals of the (i)th field are displayed on the LCD panel 108 in Step 20', the image signals of the (i)th field are compared in Step 15' with the image signals of the (i−1)th field which were stored in the memory 114 in Step 10'.

If the image signals of the (i)th field are different from the image signals of the (i−1)th field, for example, the image signals X(i−1)n and Y(i−1)m of the (i−1)th field are different by at least 50% from the image signals X(i)n and Y(i)m of the (i)th field, the image signals in question are determined to be those for a changing image display. As a result, Step 45' is carried out to drive the LCD panel 108 in a normal manner. The image signals of the (i)th field are displayed in Step 20'. If the image signals of the (i)th field are approximately the same as the image signals of the (i−1)th field, i.e., no more than 50% different, the image signals are determined to be for the constant image display. Consequently, Step 50' is executed to drive the LCD panel 108 in a low-voltage drive mode, and Step 20' is then executed to display the image signals of the (i)th field.

In Step 25', the image signals of the (i)th field are stored in the memory 114. Subsequently, a similar sequence of procedural operations is repeated. Before the image signals of the (i+1)th field are displayed on the LCD panel 108 in Step 35', the image signals of the (i+1)th field are compared with the image signals of the (i)th field which were stored in the memory 114 in Step 25'. Either Step 45' or Step 50' is selected and executed in accordance with the result of that comparison. In Step 40', the image signals of the (i+1)th field are stored in the memory 114 as in the previous case.

While TFTs are used in the LCD panel in the above-mentioned embodiment, STSs may be used instead. In this case, the LCD panel is driven by a segment driver and a common driver. Also, in the second embodiment, the panel power source is used for supplying power to the LCD panel. Alternatively, a system power source for the controllers may be used for supplying the electric power to the LCD panel. In this case, the system power source is controlled to decrease the power supplied for the constant image display. A cathode-ray tube may also be used for the display section. In this case, the voltage applied to the cathode of the cathode-ray tube is decreased when a constant image is displayed.

In the display arrangement of the invention as described above, when a changing image is displayed, a normal voltage is applied to the LCD panel, thereby securing a normal image display. When a constant image is displayed, a preset voltage which is lower than the normal voltage is applied to the LCD panel, thereby saving electric power. Thus, the display arrangement of the invention can display a quality image with reduced power consumption.

Although the invention has been described herein with reference to specific embodiments, many modifications and variations therein will readily occur to those skilled in the art. Accordingly, all such variations and modifications are included within the intended scope of the invention.

What is claimed is:

1. A display arrangement comprising:

a display section for presenting visual images;

memory means for storing a set of image signals to be supplied to the display section;

input means for supplying successive sets of image signals to be stored in the memory means:

comparison circuit means for determining whether the set of image signals to be supplied to the display section are those for a constant image or for a changing image display by comparing a set of image signals to be supplied to the display section with a previous set of image signals read out of the memory means;

drive circuit means for driving the display device; and control circuit means responsive to the comparison circuit means for controlling drive means so that, when the comparison circuit means determines that the image signals to be supplied to the display section are for a constant image display, the drive circuit means drives the display section in a reduced-power drive mode.

2. A display arrangement according to claim 1 wherein the reduced-power drive mode is a spread-out drive mode.

3. A display arrangement according to claim 1 including a power source for supplying power source voltage to the display section and wherein the reduced-power mode is a mode in which the power source voltage supplied to the display section is reduced to a level lower than the power source voltage supplied when a changing image is displayed.

4. A display arrangement according to claim 1 in which the display section comprises an LCD panel and the memory means comprises a nonvolatile memory.

5. A display arrangement according to claim 1 wherein the comparison circuit means determines the image signals to be for a constant image if more than 50% of the compared image signals coincide with each other.

6. A display arrangement comprising:

a display section for presenting visual images;

input means for supplying successive fields of signals to a memory means and to the display section;

memory means for storing image signals of a first field supplied to the display section;

comparison circuit means for determining whether the image signals of a second field subsequently supplied to the memory means and to the display section are those for a constant image display or for a changing image display by comparing the image signals of the second field with the image signals of the first field stored in the memory means;

drive circuit means for driving the display section; and control circuit means responsive to the comparison circuit means for controlling the drive circuit means so that, when the comparison circuit means determines that the image signals supplied to the display section are those for a fixed image display, the drive circuit means drives the display section in a reduced-power drive mode.

7. A display arrangement according to claim 6 wherein the reduced-power drive mode is a spread-out drive mode.

8. A display arrangement according to claim 6 including a power source for supplying power source voltage to the display section and wherein the reduced-power mode is a mode in which the power source voltage supplied to the display section is reduced to a level lower than the power source voltage supplied when a changing image is displayed.

9. A display arrangement according to claim 6 in which the display section comprises an LCD panel and the memory means comprises a nonvolatile memory.

10. A display arrangement according to claim 6 wherein the comparison circuit means determines the image signals to be for a constant image if more than 50% of the compared image signals coincide with each other.

* * * * *